Aug. 8, 1967     E. P. MORRIS     3,334,421
VENEER DRYER
Filed Sept. 21, 1964     8 Sheets-Sheet 1
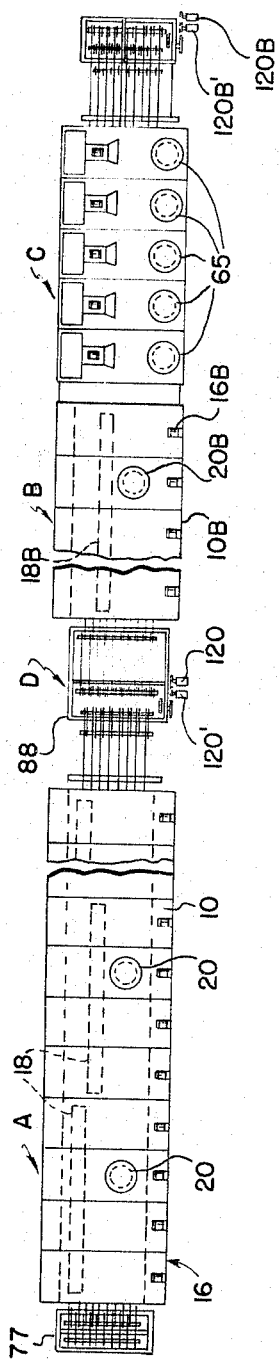
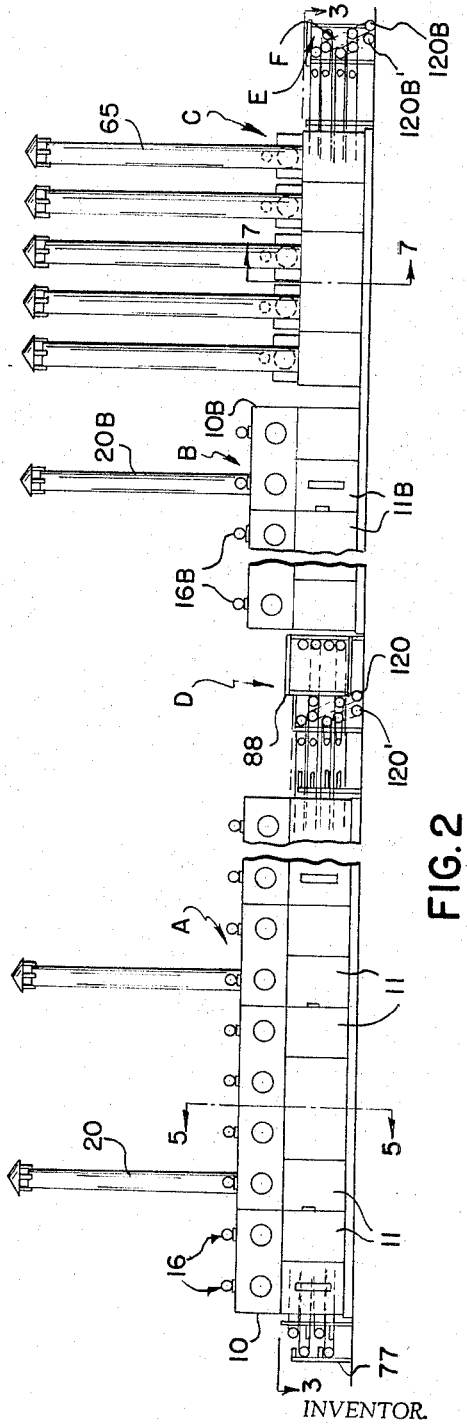
INVENTOR.
EDWARD P. MORRIS
BY *Williams, David,*
*Hoffmann & Yount*
ATTORNEYS Aug. 8, 1967   E. P. MORRIS   3,334,421
VENEER DRYER
Filed Sept. 21, 1964   8 Sheets-Sheet 2

INVENTOR.
EDWARD P. MORRIS
BY Williams, David, Hoffmann & Hunt
ATTORNEYS

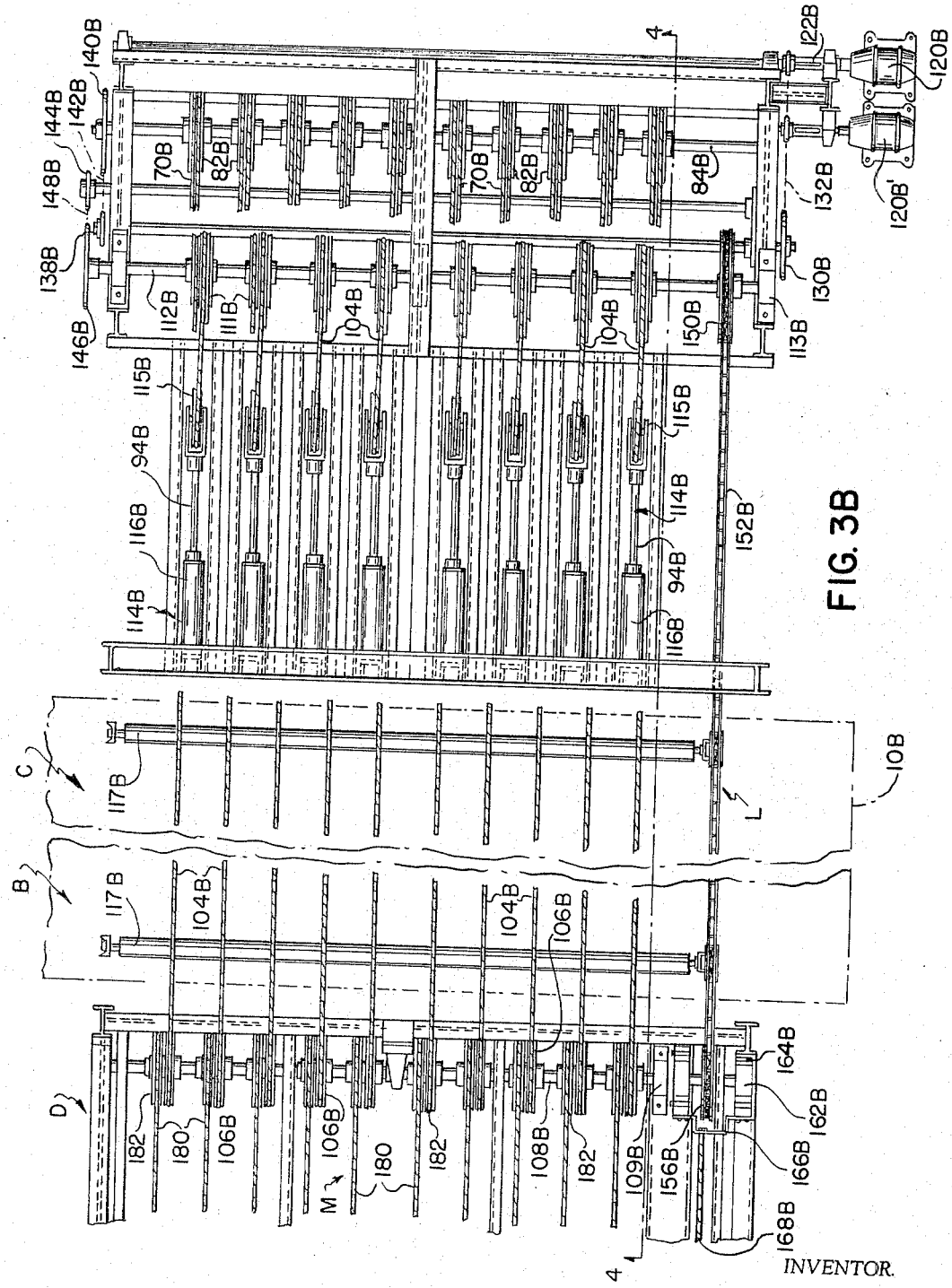

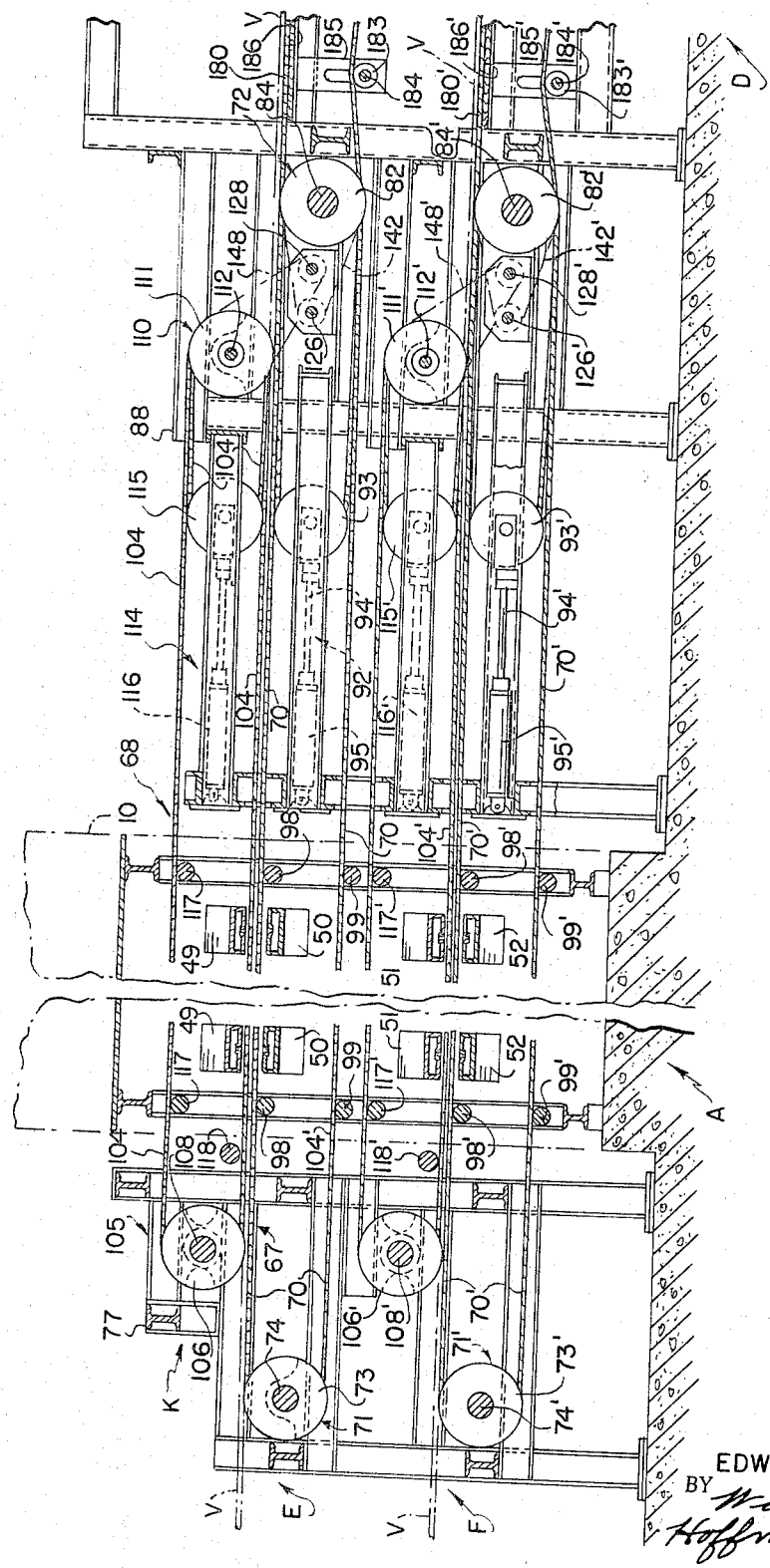

Aug. 8, 1967     E. P. MORRIS     3,334,421
VENEER DRYER

Filed Sept. 21, 1964     8 Sheets-Sheet 5

INVENTOR.
EDWARD P. MORRIS
BY *Williams, David,*
*Hoffmann & Yount*
ATTORNEYS

INVENTOR.
EDWARD P. MORRIS
BY Williams, David, Hoffmann & Yount
ATTORNEYS

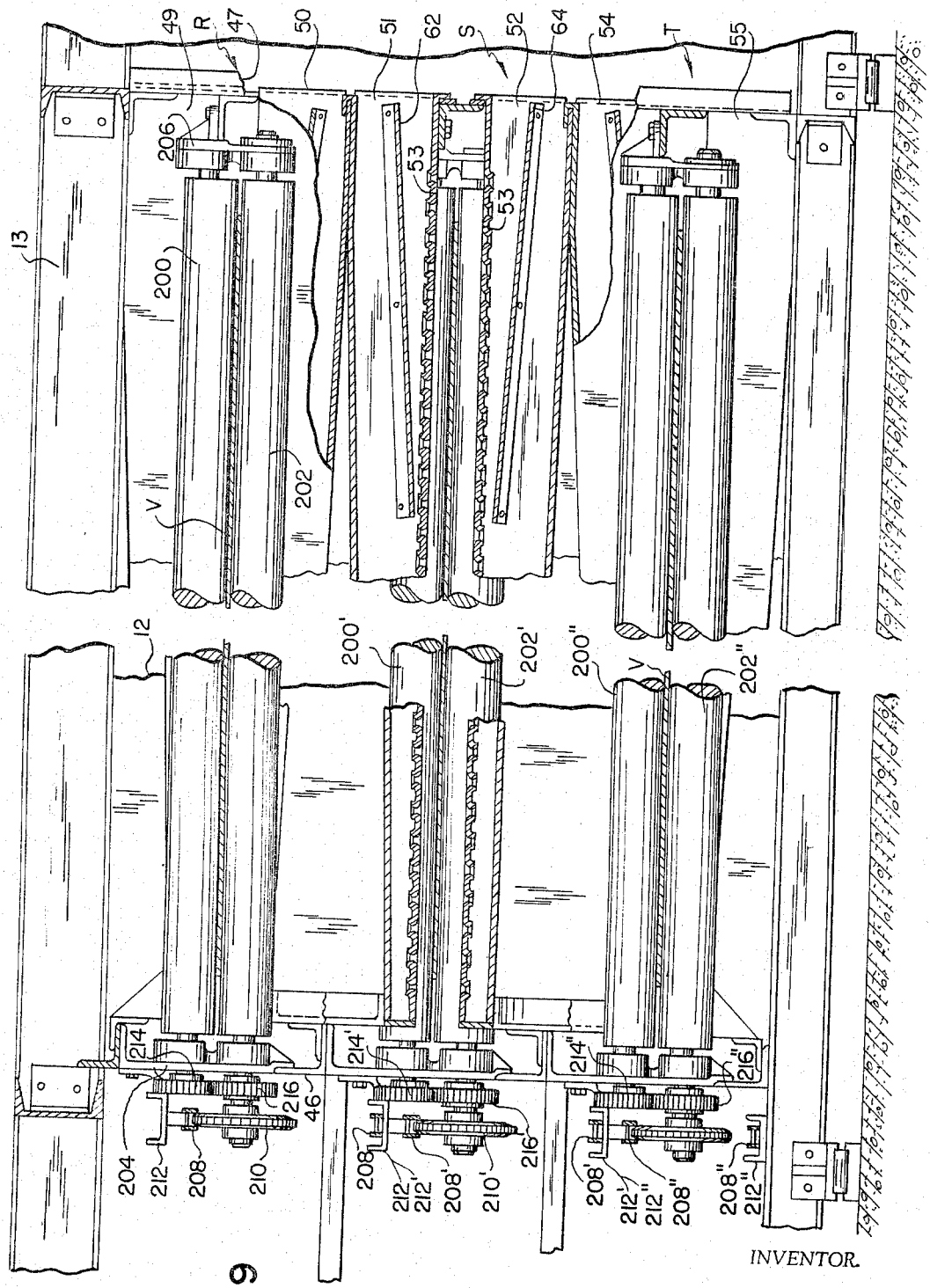

United States Patent Office 3,334,421
Patented Aug. 8, 1967

3,334,421
VENEER DRYER
Edward P. Morris, Painesville, Ohio, assignor to The Coe Manufacturing Company, Painesville, Ohio, a corporation of Ohio
Filed Sept. 21, 1964, Ser. No. 397,886
11 Claims. (Cl. 34—205)

The present invention relates to the drying of material in sheet form, especially veneer and like material which is relatively light and apt to be warped or otherwise irregular in shape and/or to become so, or more so, during drying. This application is a continuation-in-part of my co-pending application SN 144,651, filed Oct. 12, 1961, entitled, Veneer Dryer, and the disclosures of said application including the specification, drawings, etc. thereof are incorporated herein by reference.

The present invention contemplates the drying of veneer as a continuous operation or substantially so, as it comes from the veneer lathe or from one of the "run-out" tables or "trays" commonly employed at the knife or veneer side of the lathe, that is, in the condition in which the veneer is fed to the "clipper" according to the practice prior to the present invention.

The principal object of the invention is the provision of a novel and improved method of and apparatus for drying veneer, preferably prior to its reduction to "veneers" and as a part of a continuous or semi-continuous operation, wherein a gaseous drying medium, preferably heated air, is impinged at relatively high velocity on opposite sides of the veneer.

Another object of the invention is the provision of a novel and improved dryer for drying veneer comprising a substantially closed housing having one or a plurality of horizontal conveyors extending therethrough upon which veneer to be dried is supported and conveyed, conduit means at the top and bottom sides of the path or paths traveled by the veneer through the housing and having orifices or nozzles in the sides thereof adjacent to the veneer for directing a drying medium, preferably heated air, against opposite top and bottom sides of the veneer, and means for providing and circulating or forcing heated air through the conduit means and out the orifices or nozzles therein to cause it to impinge upon opposite sides of the veneer being dried at a relatively high velocity.

Another object of the invention is the provision of a novel and improved method of an apparatus for drying veneer, as a part of a continuous or semi-continuous operation wherein the veneer is conveyed through a relatively long housing, or a plurality of relatively long housings arranged in tandem, between endless cables and wherein both sides of the material is impinged by a gaseous drying medium, preferably heated air, moving at relatively high velocities.

Another object of the invention is the provision of a novel and improved apparatus for drying veneer as set forth in the preceding object which dryer renders practical the drying of veneer in lengths greater than heretofore contemplated and in which the veneer is delivered to the dryer substantially in the condition in which it is in as it is peeled from the logs by the lathe.

Another object of the invention is the provision of a novel and improved apparatus for drying veneer comprising an elongated housing having one or more conveyors therein adapted to convey material therethrough in a generally horizontal path which conveyor or conveyors includes one or more traveling endless belt-like members or assemblies, preferably composed of a plurality of cables, having a reach disposed at the lower side of the path for supporting the veneer being dried and a reach thereabove for holding the veneer on the first-mentioned reach, in combination with means, preferably of the character heretofore mentioned, for circulating a heated drying medium, preferably air, around and about the veneer to be dried.

The invention resides in certain operations, constructions and combinations and arrangements of parts, and further objects and advantages will be apparent to those skilled in the art to which the invention relates from the following description of the preferred equipment or apparatus for practicing the invention described with reference to the accompanying drawings forming a part of this specification and in which:

FIG. 1 is a top plan view with parts broken away of a veneer dryer embodying the present invention;

FIG. 2 is a side elevational view with parts broken away of the veneer dryer shown in FIG. 1;

Figure 3A:
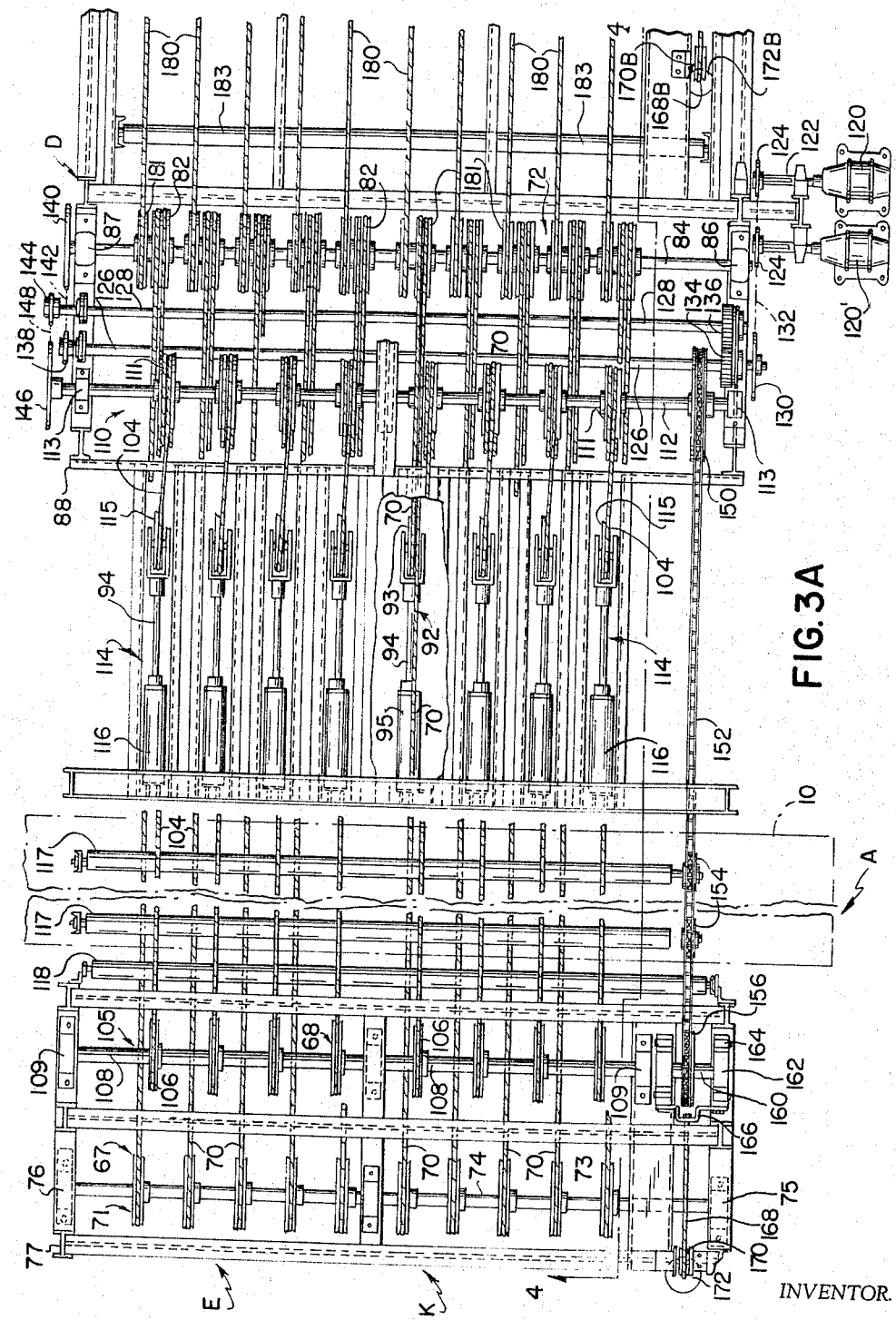
Figure 4B:
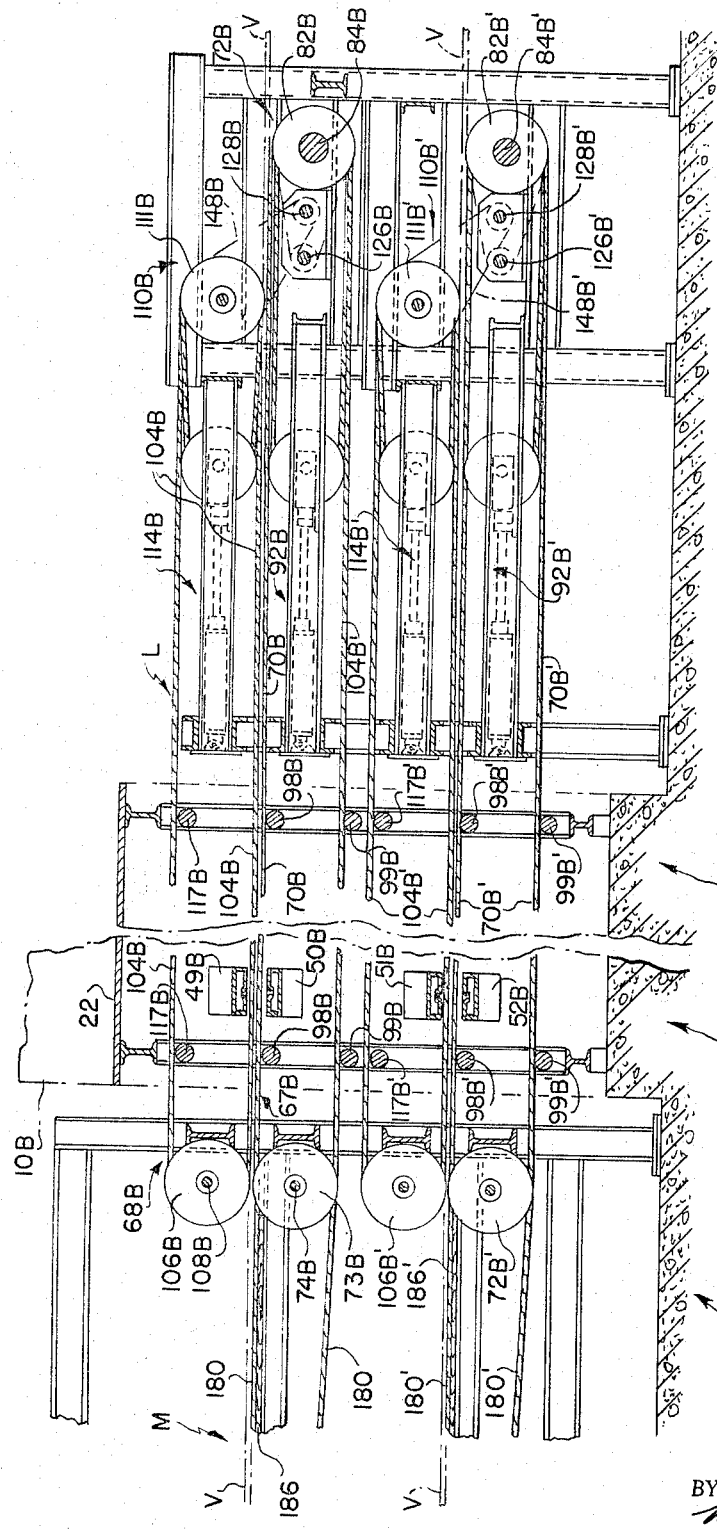
Figure 10:
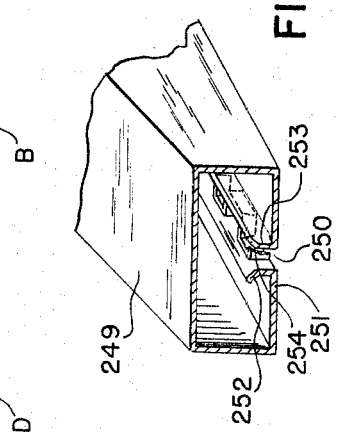
Figure 5:
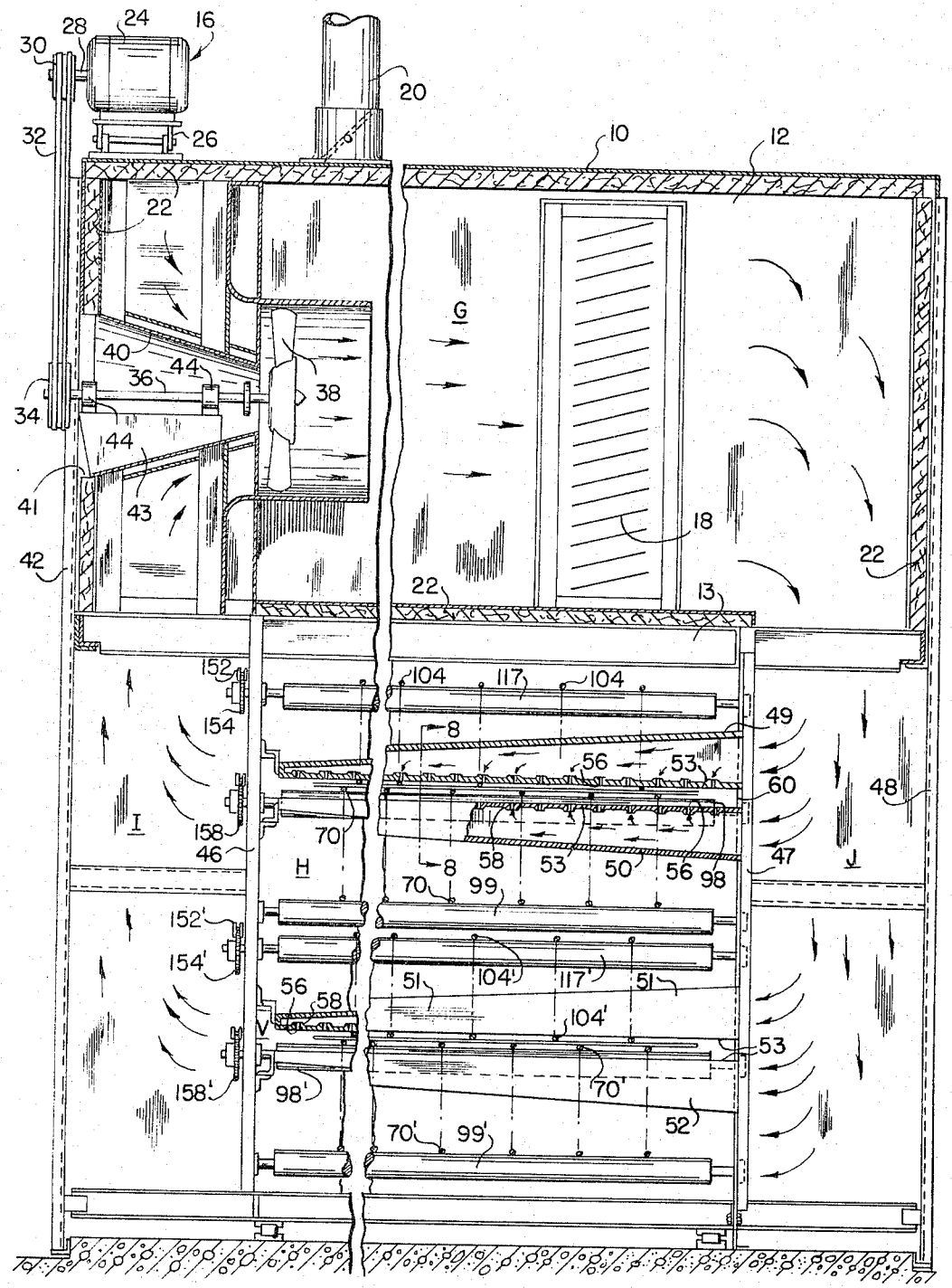
Figure 6:
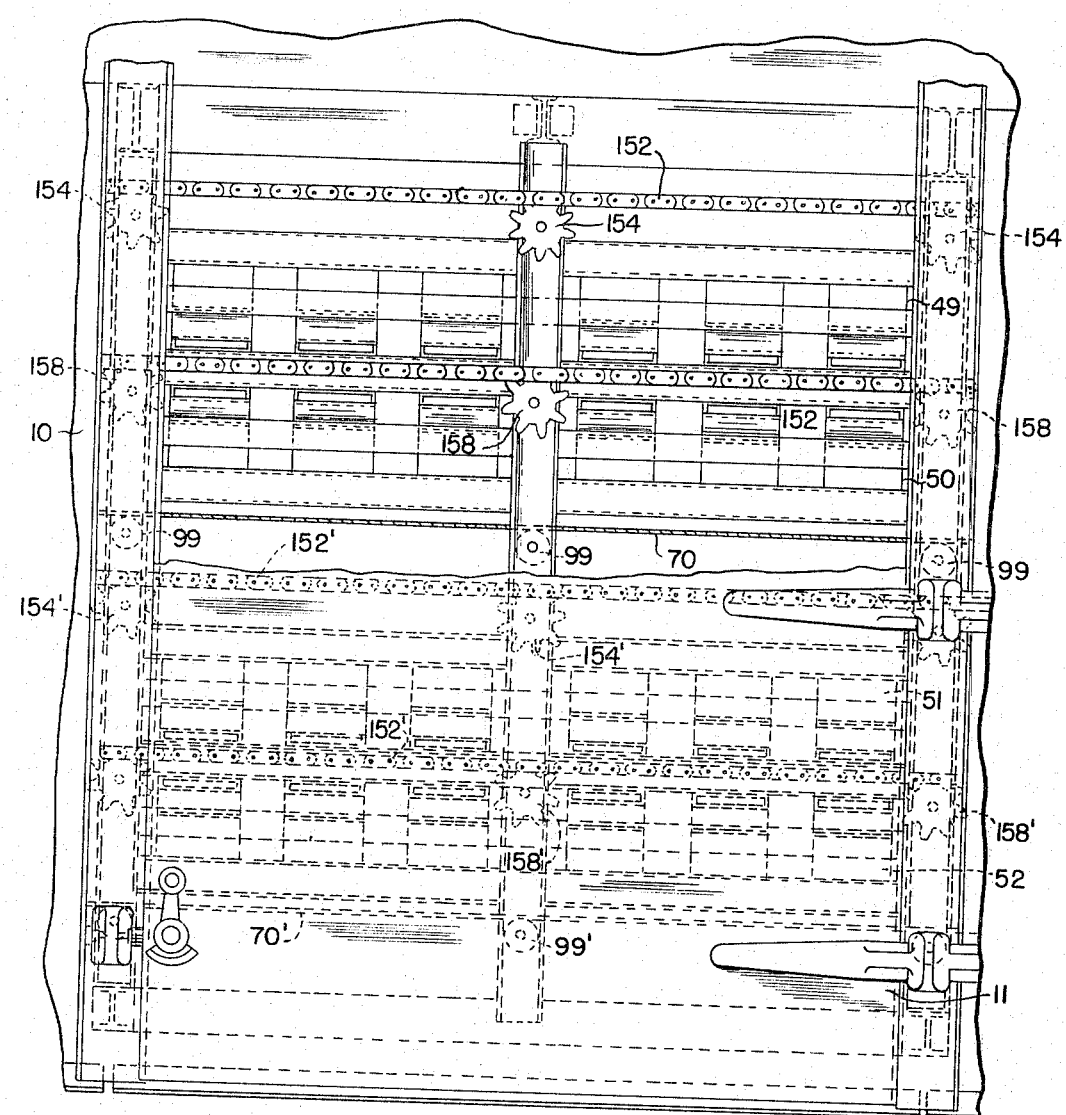
Figure 7:
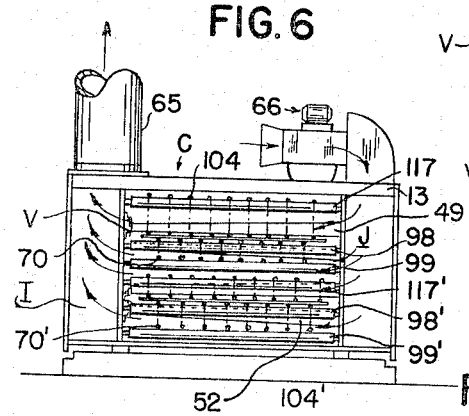
Figure 8:
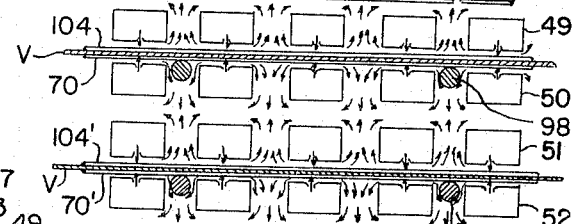

FIGS. 3A and 3B together are an enlarged fragmentary sectional view of the veneer dryer shown approximately on the line 3—3 of FIG. 2;

FIGS. 4A and 4B together are an enlarged sectional view of the dryer shown approximately on the line 4—4 of FIGS. 3A and 3B;

FIG. 5 is an enlarged sectional view of the dryer shown approximately on the line 5—5 of FIG. 2;

FIG. 6 is a fragmentary side elevational view of the dryer as viewed from the left-hand side of FIG. 5;

FIG. 7 is a diagrammatic cross sectional view of the cooling chamber of the dryer taken substantially along line 7—7 of FIG. 2;

FIG. 8 is a fragmentary view of the dryer taken substantially along line 8—8 of FIG. 5 illustrating the flow of the drying medium about the veneer being dried;

FIG. 9 is a fragmentary cross sectional view of the dryer corresponding generally to FIG. 5 but showing a modified form of conveyor means; and FIG. 10 is a fragmentary view of a modified form of an air conduit.

Although the illustrative equipment will be described in detail, it is to be understood that the invention is not limited to the use of equipment having the construction and arrangement of the parts shown and described, but is capable of being otherwise practiced and carried out in various ways. It is also to be understood that the phraseology or terminology employed herein is for the purpose of description and not of limitation, and that there is no intention to thereby limit the invention beyond the requirements of the prior art.

Referring to the drawings, the preferred apparatus shown is a two-deck steam-heated dryer for simultaneously drying two continuous sheets of green veneer moving through the dryer in linear paths one spaced above the other. The dryer, as shown, comprises two elongated dryer units A and B arranged in tandem each about 18 feet wide, 14 feet high and over 200 feet long. Each unit includes an elongated enclosure or housing 10 of rectangular cross sectional shape through which veneer to be dried is caused to travel along vertically spaced, horizontal paths from left to right, as viewed in FIGS. 1 and 2, on two tiered conveyor means or conveyor systems E and F. From the discharge end of unit B the veneer travels through a cooling unit C. A suitable transfer unit or section D is interposed intermediate the adjacent ends of the units A and B to transfer the veneer from unit A to unit B.

Since each of the two dryer units A and B and the two conveying systems E and F are essentially duplicates of one another, only the dryer unit A and the upper conveyor or conveyor system E will be described in detail. The duplicate parts of the dryer unit B will be designated by the same reference characters as dryer A with the suffix B added thereto and the duplicate parts of the lower conveyor system F will be indicated by adding a prime mark to the corresponding reference numeral in conveyor E having prime marks applied thereto.

The housing 10 of dryer unit A is substantially rectangular in cross section and comprises a frame made up of suitable structural members, etc. welded and/or bolted together. The exterior of the housing is sheet metal or like material and includes a plurality of access doors designated generally by reference characters 11 along opposite sides of the unit A. In the particular embodiment shown, dryer unit A which, as previously stated, is over 200 feet long, has the interior thereof divided into a plurality of compartments by transverse vertical partitions 12 (FIG. 5) spaced about 24 feet part except for drying section H. If desired, however, the vertical partitions 12 can extend the entire width and height of unit A and have openings in the central portion thereof to permit the passage therethrough of the necessary parts of the conveyor systems E and F, etc. As a third alternative, the partitions 12 can extend only through the upper section of unit A, that is, the section above partition 13. In addition to the vertical partitions 12 the unit is provided with a longitudinally extending horizontal partition 13 above the drying section H. The horizontal partition 13, the vertical partitions 12, the upper side or roof of unit A, and portions of the sides of unit A together define a plurality of heating chambers G. Each of the heating chambers has associated with it four fan assemblies 16, one heater unit 18, and one damper controlled vent stack 20.

Dividing the dryer unit into a plurality of compartments each having its own air heating and circulating mechanism, permits different temperature zones to be established along the unit, preferably with the highest temperature zones at or near the entrance end of the unit and the zones thereafter to the exit end of unit A having progressively lower temperatures with the lowest temperature zone at the exit end of the unit. At least the top and the upper parts of the side walls of the heating chambers G are provided with insulation 22 of any suitable form to minimize the heating loss through the walls of the unit. While in the unit shown the partitions 12 divide the same into compartments approximately 24 feet long, each having four fan assemblies, one heating unit, and one vent stack, it will be understood that the partitions may be spaced farther apart or closer together and that any division of compartments thus formed may have any suitable number of fans and heating units and any desired arrangement thereof, etc., so long as the necessary amount of heated drying medium is circulated through the dryer unit and comes into required contact with the veneer to be dried.

The fan assemblies 16 each consist of a motor 24 supported on the top of the dryer unit adjacent to the left-hand side as viewed in FIG. 5 by a suitable adjustable support means or mounting 26. Output shaft 28 of the motor 24 carries drive pulley 30 on the outer end thereof and a drive belt 32 is trained about pulley 30 and about a driven pulley 34 secured on a horizontal shaft 36 therebelow which shaft extends into the heating chamber G and carries a fan 38 on the end opposite pulley 34. A limited amount of outside air is admitted to the heating chamber G adjacent to the hub of the fan 38 by a frustoconical conduit 40 concentric with the shaft 36 and extending from an opening 41 in the side wall 42 of the dryer unit and terminating near the hub of the fan. A suitable damper can be provided, if desired, for controlling the amount of outside air admitted through inlet pipe 40 into the heating chamber G. Shaft 36 is supported for rotation by means of a base 43 carrying bearings 44 disposed within the frustoconical inlet pipe 40.

The particular heater units 18 disclosed are steam coils and, in the embodiment shown, the heater units in alternate chambers G are offset from one another transversely of the length of the dryer unit, as clearly illustrated in FIG. 1.

The drying section H located in the lower central portion of unit A and through which portions of the conveyors E and F extend is defined in part by a plurality of vertically disposed frame structures 46 and 47 which are spaced inward of opposite sides 42 and 48 of the dryer unit and which extend from the heating chamber G to the floor of unit A. These frame members along with the horizontal partition 13 and floor of unit A form an elongated section generally rectangular in cross section and which represents the drying section H. The space between the frame structures 46, 47 and sides 42, 48 of unit A form two air circulating chambers I and J, respectively. Chamber J is in communication with the air discharge end of heating chamber G and the right hand side of the drying section H which is arbitrarily designated the air inlet side. Circulating chamber I is in a communication with the opposite or air inlet end of heating chamber G and the arbitrarily designated outlet side of the drying section H.

A plurality of discrete elongated conduit means 49, 50, 51, and 52 extend transversely of the length of drying section H and are removably supported at their respective ends by the frame structures 46 and 47 each of which comprise suitable vertical and horizontal structural members such as angle beams, etc. The conduits illustrated are generally rectangular in cross section having one of their ends open and decrease in cross sectional area from their open ends to their other ends which are closed. Each conduit is preferably removably supported by the vertical frames 46 and 47 in a manner so that they can be rapidly removed from their supported positions for repair, etc. The conduits 49, 50, 51, and 52 are positioned in the drying section H in four vertically spaced rows; the two top rows 49 and 50 cooperating with the upper conveyor system E and the two lower rows 51 and 52 cooperating with the lower conveyor system F. The conduits of the upper and lower rows associated with each conveyor system are arranged in pairs and are identical except that the conduits 50 and 52 of the lower rows of conduits are inverted relative to the conduits 49 and 51 of the upper rows such that the pair presents opposing horizontal sides 53 vertically spaced from one another a distance sufficient to permit passage of the veneer and parts of the conveying means or systems therebetween. The opposing surfaces of the adjacent sides 53 are relatively even and each side is provided with a row of apertures 56 extending therethrough surrounded by inwardly projecting collars 58. The collars surrounding each aperture and projecting into the interior of the conduit define or form an air discharge means or nozzle.

The conduits 49, 50, 51, and 52 shown are formed from sheet metal and the opposing sides 53 are spaced approximately 1¼" from the veneer path. The sides 53 are approximately 7" wide and the apertures 56 therein are ¼" in diameter, spaced on 1½" centers and are formed by a round punch in such a manner as to form the inwardly extending projections or collars 58 surrounding each aperture. Punching the apertures 56 in sides 53 provide the collar or nozzle 58 which has a projection length of approximately 3 or 4 times the thickness or gage of the sheet material forming the conduits based on the diameter of the holes contemplated in the preferred embodiment. The air discharge nozzles including the apertures 56 and their surrounding inwardly extending projections 58 are arranged to direct air from the interior of the air ducts or conduits at relatively high velocity normal to and against opposite sides of the veneer V being dried. The configuration of the air ducts is preferably such as to produce an even or uniform distribution of the drying medium across the surface of the veneer. The spent air drifts or moves to the outlet side of the drying section and flows into circulation chamber I.

The entrance or open ends of the air ducts 49, 50, 51, and 52 are detachably secured to plates 60 which in turn are connected to and supported by the members of the frame structure 47 in such a manner so as to form a solid wall at the inlet side of the drying section H except for the openings in the air ducts. Suitable baffles, such as baffles 62 and 64 shown in FIG. 9 can be provided within the air ducts or conduits, if required, to better obtain a uniform or substantially uniform discharge of heated air throughout the length of the ducts. Any suitable arrangement of baffles within the air ducts and/or apertures 56 in sides 53 can be employed to obtain any desired variety of air distribution patterns for drying the material.

The air circulation pattern in unit A is indicated by arrows in FIG. 5. Fans 38 drive or force the drying medium through the steam coils 18 in the heating chambers G and from the heating chambers into circulation chamber J from which the air flows into the open ends of conduits 49, 50, 51, and 52. From these conduits the hot air is discharged through the nozzles 58 onto opposite sides of the veneer and thereafter drifts into circulation chamber I to be drawn into the heating chambers G where the circulation cycle is repeated. The openings 41 and conduits or pipes 40 provide for the intake of cool air from the outside to mix with the air within the unit. As previously mentioned, suitable means can be provided to control the amount of fresh air introduced into air heating chambers G.

The air circulating system or systems are such that the heated air is discharged from the apertures 56 in the air conduits 49, 50, 51, and 52 at a speed of not less than about 2500 feet per minute, preferably about 4,000 feet per minute. The construction disclosed is such that a multiplicity of jets of high speed air are directed against opposite sides of veneer passing through the drying section in such a manner as to break the surface tension of the moisture on the green veneer and thereby uniformly dry the veneer in a minimum of time. While air ducts or conduits 49, 50, 51, and 52 of specific shape, etc., have been shown and described it is to be understood that air ducts or conduits of any suitable size and arranged in any suitable manner may be employed and that the nozzles or apertures in the air ducts may be of any suitable configuration such as round, square, rectangular, etc., and of any desired size, number and/or spacing, etc., including one or more elongated slots extending the length of the conduits as best suit different conditions of the material and different types of material to be dried. While the air ducts or conduits shown are rectangular in cross section, it is to be understood that other cross sectional shapes or configurations may be used.

The conveyor systems in the unit B continue through the cooling unit C at the discharge end of the dryer unit B. The construction of the cooling unit C is generally similar to that of the dryer units except for the omission of the heater units which are not required since the air circulating through the cooling unit is not heated. The air ducts or conduits therein corresponding to the air ducts or conduits 49, 50, 51, 52 employed in the dryer units could, however, be omitted from the cooling unit, if desired. Referring particularly to FIGS. 1, 2, and 7 the cooling unit shown is 30 feet long and the air is circulated therethrough by five blower units designated generally as 66 each of which forces outside air through the cooling unit transversely of the length thereof, the air first passing through the inlet circulating chamber J then through the cooling section N in which the conveyor systems extend and out through chamber I adjacent to the left hand side of the cooling unit as viewed in FIG. 7 and a vent stack 65. The vent stack 65 is generally similar to the vent stacks 20 of the dryer units. Since the air circulated through the cooling unit is not heated the heating chambers employed in the dryer units are omitted and the fan units 66 and the vent stacks 65 are supported on the top of the cooling section N which conforms to that of the partition 13 of the dryer units.

As previously stated, the conveyor systems E and F extend lengthwise through the dryer units A and B and the cooling unit C and are disposed relative to one another in a tiered relationship with the veneer to be dried or being dried conveyed through the units in a plurality of vertically spaced, generally horizontal paths located between the opposite sides of the air ducts or duct means associated with the respective conveyor systems. Only conveyor system E, as previously stated, is being herein described in detail.

Conveyor system E comprises an entrance or first conveyor assembly K associated with dryer unit A, an exit or second conveyor assembly L associated with dryer unit B and a transfer or connective conveyor assembly M. The entrance assembly K, as shown, includes lower and upper endless belt-like sections 67 and 68, respectively, extending through the dryer unit A, each comprising a plurality of endless members, in the present instance wire cables 70, reeved about suitable support means at or adjacent to opposite ends of the unit A. The upper reach of the lower endless belt-like section 67 supports and conveys the veneer V through the unit A and this section is hereinafter sometimes referred to as the conveyor section. The lower reach of the upper endless belt-like section 68, rests upon the veneer being conveyed or carried through the unit A by the conveyor section 67 and assists in or holds the veneer on the upper reach of the conveyor section and is hereinafter sometimes referred to as the holddown section.

The cables 70 of the lower belt-like section 67 are reeved about rotatable support means 71, 72 at or adjacent to the entrance and exit ends of the unit A, respectively. In the embodiment shown the support means 71 includes a plurality of pulleys 73 spaced transversely of one another along shaft 74 supported in suitable bearing means 75 and 76 located on an entrance frame section 77 of the dryer unit A at the entrance end of the unit. The number of pulleys 3 correspond to the number of endless conveying members 70 and for the purpose of illustration ten have been shown. The rotatable support means 72 located adjacent to the exit end of dryer unit A comprises, in the illustrated embodiment, a plurality of pulleys 82 fixed on a shaft 84 which shaft is in turn rotatably supported in suitable bearing means 86 and 87 on the drive frame section 88 of the dryer unit A. Each of the pulleys 82 of the rotatable support means 72 have a plurality of cable guides or grooves to maintain the cable passes trained thereover separated.

Each of the cables 70 is provided with a discrete takeup means 92 located intermediate the rotatable support member 72 and the exit end of housing 10 of dryer unit A. Each of the particular takeup means illustrated comprise a pulley 93, around which the cable 70 which it maintains taut is reeved. The pulleys 93 are connected to the end of piston rods 94 of piston-cylinder assemblies 95 pivotally connected to a cross member of the frame 88 and suitable for having a predetermined fluid pressure maintained therein and in turn for maintaining a predetermined tension on the cables 70. Each piston-cylinder assembly 95 has fluid under pressure supplied to it in a well known manner to maintain a predetermined pressure therein for biasing the piston rod 94 and in turn pulley 93 towards the left, as viewed in FIGS. 3A and 4A. Although hydrauilc fluid pressure-type takeup means has been illustrated it is to be understood that other suitable takeup means can be utilized without departing from the spirit of the invention. For example, a discrete gravity type of takeup means may be used with each endless member 70 for maintaining desired tensions on the respective members. To incorporate such a gravity takeup system for each of the endless members would necessitate mounting the pulleys of one of the rotary support means 71, 72 so as to be adjustable lengthwise of the dryer unit A. A suitable means such as cables would have to be provided to connect the pulleys and weights and these cables would have to be fed either outwardly of the paper or into the paper, as viewed in FIGS. 4A and 4B, so as not to interfere with the conveyor system and veneer.

A plurality of transversely extending rolls 98 are provided throughout the length of the dryer unit A for supporting the upper or conveying reaches of the cables 70. The ends of the rolls 98 are rotatably supported in suitable bearing means on the frame assemblies 46 and 47. Each of the endless conveying members 70 is trained over or reeved about one of the pulleys 73 of the rotatable support means 71. From the rotatable support member 71 the upper reach of the members or cables 70 extend lengthwise through the drying section H of housing 10 of dryer unit A in a horizontal direction over the rolls 98 and out through the exit end of the dryer unit where they are trained over and are reeved about the rotatable support means 72 being positioned in one of the guide grooves of the pulleys 82. From the pulleys 82 the cables extend around one of the pulleys 93 of its associated takeup means 92 and back around second cable guide grooves in the pulleys 82 and then back through the drying section H of unit A, over support rolls 99 similar to the rolls 98, and continue around the pulleys 73 of the rotatable support means 71. Each endless member or cable 70 forms a continuous loop disposed in a substantially vertical plane. The upper reaches or parts of the cables, that is, the portions of the cables 70 extending between the pulleys 73 of the rotatable support means 71 and pulleys 82 of the rotatable support means 72 form the conveying reach of the lower endless conveyor section 67 of the entrance of first conveyor assembly K of the conveyor system E. Those parts of the cables 70 which continue around the pulleys 82 of the rotatable support means 72 and around pulleys 93 of the takeup means 92 then back to and around the pulleys 82 and then return to the pulleys 73 of the rotatable support means 71 complete the closed cable path and form the return reach of the conveyor section 67.

The endless belt-like hold-down section 68 of the assembly K of the conveyor system E is similar to the conveyor section 67 and comprises a plurality of endless hold-down members which, in the preferred embodiment shown, are cables 104 spaced transversely from one another and extending lengthwise through the dryer unit A. The endless hold-down members are supported at the entrance end of unit A by a rotatable support means 105 comprising a plurality of idler pulley 106 spaced along and journalled on shaft 108 which in turn is supported by suitable bearing means 109 on the entrance frame section 77. Shaft 108, in the embodiment shown, is disposed above and to the right of shaft 74 as viewed in FIG. 4A for a purpose to be described hereafter. The endless hold-down cables 104 are supported at their other ends by a rotatable support means 110 comprising a plurality of pulleys 111 spaced along and fixed to a driven shaft 112 supported by suitable bearing means 113 in framework 88. A plurality of hydraulically actuated takeup means 114 are provided for each endless hold-down member 104 which takeup means are similar to the takeup means 92 previously described in connection with the endless conveying members 70 and have pulleys 115 connected to the ends of the piston rods of piston-cylinder assemblies 116. A plurality of rolls 117 are provided in the drying section of dryer unit A similar in structure to rolls 98 or 99 and which engage underneath and support the upper or return reach of the endless hold-down members 104. An idler hold-down roll 118 is provided for the endless hold-down members 104 adjacent to the entrance of the drying section H of unit A.

The endless hold-down members 104 are reeved over or about pulleys 111 of the rotatable support means 110 and then extend through the dryer passing over rolls 117 to pulleys 106 of rotatable support means 105. The cable extends over and around pulleys 106 under idler hold-down roll 118 and through the housing 10 to pulleys 111 of the rotatable support means 110. The cables 104 extend around pulleys 111 over and around pulleys 115 of the takeup assemblies 114 and back to pulleys 111 to complete a circuitous cable path to thereby form a plurality of continuous loops disposed in horizontally spaced substantially vertical planes. Each hold-down member 104 has a hold-down reach which extends from the bottom side of pulley 106 passing under hold-down roll 118 through the dryer unit A and to a point where the member 104 begins to wrap around pulley 111 and a return reach which extends from the termination point of the hold-down reach on pulley 111 and continues thereover and over and around takeup pulley 115, back around and over pulley 111, back through the drying section H of dryer unit A passing over rolls 117 and around pulley 106 to the point of initiation of the hold-down reach. The hold-down reaches of the members 104 are preferably offset in the horizontal direction transversely of the length of the unit A from the conveying reaches of the members 70, as is illustrated in FIG. 5, so as to engage different portions of the opposite surfaces of the veneer. The hold-down reaches are supported through the dryer on the veneer and in absence of veneer, rest on rollers 98.

The veneer V to be dried is introduced at the left-hand end of dryer unit A, as viewed in FIG. 4A, between the conveying reaches of the conveying members 70 and the hold-down reaches of the endless hold-down members 104 and is conveyed by conveyor system E through dryer unit A and into the transfer unit D. A veneer feed area is provided at the entrance end of unit A by the spacing of the support means 105 inwardly of or to the right of the support means 71. This arrangement provides an open area so that the veneer can be fed onto the conveying reaches of cables 70 before passing under the hold-down cables 104.

An independent drive means is provided for each of the conveyor systems E and F so that two types of veneer can be conveyed, if desired, simultaneously at different speeds through the dryer unit A to accommodate the different drying times required by each type of veneer. The drying time of a particular veneer is dictated by its characteristics such as, type of wood, moisture content, etc. Since the drive means for each of the conveyor systems E and F are identical, only the drive means for conveyor system E will be described in detail.

The drive means for conveyor system E comprises a variable speed motor 120 having an output shaft 122 with a drive pulley or sprocket 124 located on the outer end thereof. A pair of shafts 126 and 128 are supported adjacent to shaft 84 in suitable bearings in frame 88. Drive shaft 126 has a sprocket 130 located on the end thereof adjacent to the motor 120 and which is connected to sprocket 124 by a sprocket chain 132. Spaced inwardly from pulley 130 is a gear 134 fixed on shaft 126 and in driving engagement with a gear 136 fixed on the adjacent end of shaft 128. The other end of shaft 126 has a sprocket 138 connected to a sprocket 140 on shaft 84 by a sprocket chain 142. Shaft 128 has a sprocket 144 fixed on the end opposite the gear 136 and which is connected to a sprocket 146 on shaft 112 by means of a sprocket chain 148. The drive for cables 70 is transmitted from motor 120 to shaft 126 which in turn drives shaft 128 through gears 134 and 136. Shafts 126 and 128 in turn drive shafts 84 and 112, respectively, in opposite directions.

The rolls 98 and 117 may or may not be driven as desired. In the embodiment shown they are driven in opposite directions by means of a drive sprocket 150 secured on the motor side or end of shaft 112, which drive sprocket has a driving sprocket chain 152 trained thereover. The upper reach of the sprocket chain 152 engages and passes over sprockets 154 fixed on the shafts of rolls 117 and then over and around an idler sprocket 156 supported on entrance frame section 77. Chain 152 extends around sprocket 156 and returns to drive sprocket 150, over drive sprockets 158 fixed on the shafts of rolls 98, as illustrated in FIG. 6. The driving chain engages sprockets 154 and 158 in opposite runs so as to impart opposite directions of rotation to rolls 117 and 98, respectively.

A gravity takeup means is provided for sprocket chain 152 by supporting the idler sprocket 156 on a stub shaft 160 journalled in bearings 162 which in turn are supported on horizontal frame members of frame section 77 to permit sliding movement thereof relative to the frame. A pair of straps 164 are provided for each bearing which extend over the bearings 162 in such a manner as to permit movement of the bearings 162 relative to the frame lengthwise of the sprocket chain but prevent lateral shifting relative to the frame. A member 166 interconnects the left hand ends of bearing members 162 as viewed in FIG. 3A and has a central position which receives a cable 168. The cable 168 extends towards the left from member 166 and passes over a pulley 170 supported on the rear of frame 77. The end of the cable 168 is connected to a suitable weight 172. The takeup means described exerts a tension on chain 152 commensurate with the weight of the weight 172.

The section L of the conveyor system E associated with dryer unit B is similar to the section K and comprises a plurality of endless conveying and hold-down members 70B and 104B, respectively, arranged and driven in a manner similar to the endless conveying members 70 and hold-down members 104 of dryer unit A and will not be described in detail. The principle if not the only distinction between these conveyor assemblies is that the rotatable support shafts 74B and 108B for the endless members 70B and 104B, respectively, at the entrance end of unit B are disposed in vertical alignment rather than being offset as are the corresponding shafts 74 and 108 of conveyor assembly K. Aside from the differences noted, the arrangement of parts and functions are identical and identical reference numbers are applied to corresponding parts of each of the conveyors and conveyor assemblies with the addition of the letter B to the reference numbers applied to the conveyor assembly L to indicate that it is a part of dryer unit B.

Veneer emerging from the discharge end of the dryer unit A is transferred and fed into the entrance end of the dryer unit B by the transfer section D which comprises a plurality of endless members, in the present instance, cables 180, reeved about pulleys 181 detachably fixed to the shaft 84 of the rotatable support member 72 at the discharge end of unit A and pulleys 182 detachably fixed to the shaft 74B of the rotatable support means 71B at the entrance end of unit B. Provision is made for adjusting the tightness with which the respective cables 180 engage the pulleys 181 and 182 about which they are reeved in the form of idler sheaves or pulleys 183 rotatably supported on stud shafts 184 supported for vertical adjustment on plates 185. The lower reaches of the cables 180 extend and engage over the respective pulleys 183 with which they are associated and adjustment of the pulleys vertically adjusts the tension on the cables. The upper reaches of the cables 180 are, in the embodiment shown, prevented from sagging by a piece of plywood 186 placed undernearth the upper reaches of the cables and over which the upper reaches of the cables travel. The plywood is suitably supported in the frame of the transfer section D.

The motors 120, 120B employed to drive respective assemblies K and L of the conveyor system E must be such that the respective conveyor assemblies are driven at identical speeds otherwise there is danger of the veneer splitting or being otherwise damaged as it is transferred from one conveyor assembly to the other. In the embodiment shown the cables 180 maintain the conveyor assemblies traveling at the same speed if their speeds tend to vary. As an alternative construction, both conveyor assemblies K and L of the conveyor system E could be driven from the motor 120B with the power for driving the conveyor assembly K being supplied by the rotatable support means 72B through the transfer cables 180. As a further alternative construction, the two units A and B can be combined into a single dryer. In other words, either the unit A or unit B could be doubled in length and the other unit disposed of. In this event each conveying system E and F would merely consist of one endless conveying assembly and one endless hold-down assembly.

One advantage in constructing the dryer in two separate units connected by a transfer unit, such as the units A and B connected by the transfer unit D, is the ability to use the units separately or individually, for example, the unit B, while the unit A might be undergoing service. In such event, it is obvious that veneers, up to the length of the transfer section, could be fed into the entrance end of the unit B by a power driven roller conveyor, having a portion of its rolls interspaced between the endless conveyors 180, somewhat similar to the manner in which the rollers of United States Streeter Patent No. 1,809,456 issued June 9, 1931 are interposed between the endless conveyors 1 shown therein. In fact the transverse feed conveyor of Streeter could be utilized with the cables 180 of the transfer section D with very little, if any, modification. By reversing the direction of feed of the transfer conveyor, it is obvious that veneers fed into unit A could be removed at the transfer unit D. In the event either unit A or unit B is operated without the other the pulleys about which the transfer cables 180 are reeved of the inoperative unit must be freed from their supporting shaft. Suitable clutches can be employed, if desired, to detachably connect the pulleys 181 and 182 to their respective supporting shafts.

Although two endless cable type conveyor systems have been indicated as preferable, it is to be understood that other types of conveying means can be utilized, for example, roll-type conveyors. A dryer using three such roll-type conveyor systems is disclosed in FIG. 9. In this figure three vertically spaced sets of roll-type conveyor systems R, S, and T are illustrated which are suitable for conveying material through the dryer in three vertically spaced paths instead of two paths as in the preferred embodiment. The conveyors are identical so only conveyor R will be described in detail and one or more conveyor systems may be used as desired and that corresponding parts of conveyors S and T will be indicated by prime and double prime numerals, respectively.

The conveyor means R is of the double roll type and comprises a plurality of horizontally spaced pairs of top and bottom rolls 200 and 202, respectively, extending transversely of the length of the dryer, that is, transversely of the direction in which the material to be dried travels through the dryer. Each pair of rolls is identical and is supported and driven in the same manner. The rolls of each pair are alike and have journal sections at their opposite ends by means of which they are rotatably supported in brackets 204, 206 at opposite sides of the drying section H. The brackets 204 and 206 are detachably bolted to elongated annular shaped members of frame structures 46 and 47 extending lengthwise of the dryer along opposite sides thereof. The reduced journal projection of the lower rolls 202 project through cylindrical apertures in the brackets 204, 206 at opposite ends thereof and are thus supported for rotation. The journal projection at opposite ends of the upper rolls 200 project through vertically elongated slots in the brackets, which slots permit the upper roll 200 of each pair of rolls to move away from the lower roll directly therebelow upon the entrance of veneer between the rolls. The weight of the upper rolls 200 normally maintains them in contact with the rolls 202 therebelow or the veneer passing between the rolls.

Preferably, there is a pair of rolls between each opposed pair of conduits 49 and 50. The lower roll 202 of each pair is driven by a sprocket chain 208 extending through the dryer from a suitable driving rig or unit at or adjacent to the exit end of each dryer unit or dryer as the case might be. Suitable takeup means for the chain could be provided to maintain a constant tension in the chain and could take the form of the takeup means for the sprocket 156 described in connection with drive chain 152. The upper reach of the sprocket chain 208 engages the upper part of sprocket wheel 210 keyed to the end of the journal section of the lower rolls 202 projecting to the outside of the brackets 204. The lower or return reach of the sprocket chain passes underneath the sprocket wheel 210 back to the drive. Suitable brackets 212 are provided for holding the upper reach of the sprocket chain in engagement with the sprocket wheels and for supporting the lower reach of the sprocket chain in its return to the drive.

The upper roll 200 of each pair is driven at substantially the same speed as the lower roll by engaging gear wheels 214 and 216 keyed to the journal projection of rolls 200 and 202 at the near side of the dryer as viewed in FIGS. 1 and 2. These gear wheels are so constructed that they remain in mesh even though the upper roll 200 may operate a short distance from the lower roll 202 as the veneer passes therebetween. The rolls 200, 202, 200', 202', 200" and 202" of each pair are spaced between the air ducts or conduits 49, 50, 51, 52, 54, 55 and arranged in a manner to convey the veneer between opposing surfaces 53 of the conduits.

FIG. 10 is a fragmentary perspective view of an air duct or conduit 249 similar to the air ducts or conduits 49, etc., but having a single slot 250 in the side 251 facing the veneer path or the veneer being dried. The air conduit 249 is made of sheet metal and the slot shown extends substantially the entire length of the conduit, is about ¼ inch wide, and the sides thereof have inwardly extending flanges 252 and 253 provided with flared upper parts diverging with respect to one another. The height of the flanges 252, 253 less the flared portion are in the embodiment shown about ½ inch. The slot 250 is preferably divided into a number of openings about 1 inch long by a serpentine or a corrugated member 254 positioned therein and held in place as by spot welding.

In order to accomplish the continuous or substantially continuous processing of veneer from the lathe through the dryer, as contemplated herein, in substantially the same condition and orientation in which it comes from the lathe, drying apparatus incorporating a rapid drying system is necessary in order to keep the length of the apparatus within practical limits from an operational and economical point of view. This has been accomplished by using the principles of the present invention. Drying apparatus of the construction shown in the preferred embodiment using ⅜ inch diameter steel cables weighing about 0.28 pound per linear foot is successfully drying lengths of Douglas fir veneer 1/10 of an inch thick over 800 feet long at speeds in excess of 150 linear feet per minute. The weight of the hold-down cables is such as to guide the veneer through the drying apparatus and maintain it substantially level at all times while permitting limited movement of the veneer relative to the cables incident to drying and shrinking so as to reduce, if not entirely eliminate, warping and splitting of the veneer. Although the present invention is especially applicable to the drying of long lengths of veneer in the condition and orientation in which it comes from the lathe, it is applicable to the drying of veneers as previously practiced in the industry and may be embodied in dryers of any desired length.

From the foregoing description of the preferred embodiments of the invention, it will be apparent that the objects which were enumerated and others have been accomplished and that there has been provided a novel and improved dryer particularly adapted for drying veneer wherein the drying medium is forced against opposite sides of the material to be dried in the form of a jet or jets of air at high velocity. While the preferred embodiment of the invention has been described in detail it is understood, as previously stated, that the invention is not limited to the particular constructions shown but it is the intention to hereby cover all adaptations, modifications, and usages thereof which come within the practice of those skilled in the art to which the invention relates and the scope of the appended claims.

Having described my invention, I claim:

1. In apparatus for drying veneer an elongated enclosure the cross-sectional shape of which is generally rectangular and having at least a portion of one side wall movable to provide at least one access opening to the interior of the enclosure, a plurality of conveyor means located one above the other in and extending lengthwise of said enclosure and being spaced from opposite side walls thereof for conveying veneer to be dried through said enclosure in a plurality of generally horizontal paths one above the other and in a substantially flat condition, said conveyor means including means for frictionally engaging opposite surfaces of veneer conveyed thereby, means forming a first chamber above said conveyor means, a plurality of discrete elongated conduit means having their one ends open and their other ends closed extending transversely of the length of said conveyor means, means supporting a plurality of said conduit means at each of the opposite sides of said paths and in close proximity thereto for removal from said enclosure through said access opening in said one wall of said enclosure, said conduit means having their ends spaced from said side walls of said enclosure, each of said conduit means having at least one aperture in the side thereof facing said path of travel with which it is associated and forming the terminus of means extending therefrom towards the interior of said conduit means and arranged to direct the flow of a gaseous drying medium towards said paths, means defining a vertical wall spaced from one of said side walls of said enclosure and adjacent to said open ends of said conduit means and defining with said side wall a second chamber in communication with said first chamber and said open ends of said conduit means, means for circulating under pressure a gaseous drying medium through said chambers and said conduit means and said apertures whereby said drying medium is caused to impinge at high velocity against opposite surfaces of veneer conveyed by said conveyor means, and means for heating said drying medium.

2. In apparatus for drying veneer an elongated enclosure the cross-sectional shape of which is generally rectangular and having at least a portion of one side wall movable to provide at least one access opening to the interior of the enclosure, a plurality of discrete conveyor means located one above the other in and extending lengthwise of said enclosure and being spaced from opposite side walls thereof for conveying veneer to be dried through said enclosure in a plurality of generally horizontal paths in a substantially flat condition, said conveyor means including means for frictionally engaging opposite surfaces of veneer conveyed thereby, horizontal partition means in said enclosure above said conveyor means defining a first chamber located above said conveyor means, a plurality of discrete elongated conduit means having their one ends open and their other ends closed extending transversely of the length of said conveyor means, means supporting a plurality of said conduit means at each of the opposite sides of said paths of travel of the veneer and in close proximity thereto for removal from said enclosure through said access opening in said one wall of said enclosure, said conduit means having their ends spaced from one of said side walls of said enclosure, each of said conduit means having discharge means in the side thereof facing the path of travel with which the conduit means is associated including a row of apertures in said side and means extending from each of said apertures into the conduit means and arranged to direct flow of a drying medium towards said paths of travel of the veneer, means defining a vertical wall adjacent to said open ends of said conduit means and defining with said side wall of said enclosure adjacent thereto a second chamber in communication with said first chamber and said open ends of said conduit means, means for circulating under pressure a drying medium through said chambers, said conduit means and said discharge means whereby said drying medium is caused to impinge at high velocity against opposite surfaces of veneer conveyed by said conveyor means, means for removing drying medium discharged through said discharge means in said conduit means from the vicinity of said conveyor means and circulating it through said first chamber and in turn said second chamber and said conduit mean and said discharge means, means for heating said drying medium during its return to said conduit means.

3. In apparatus for drying veneer an elongated enclosure and having at least a portion of one side wall movable to provide at least one access opening to the interior of the enclosure, a plurality of discrete conveyor means in and extending lengthwise of said enclosure for conveying material to be dried through said enclosure in a plurality of generally horizontal paths located one above the other in a substantially flat condition, each of said conveyor means including a plurality of horizontally spaced pairs of horizontal rolls extending transversely of the length of said enclosure with one roll of each pair located vertically relative to the other so that the rolls of each pair are disposed on opposite sides of said paths of travel with which they are associated to frictionally engage opposite surfaces of the veneer conveyed thereby, means forming a first chamber above said conveyor means, a plurality of discrete elongated conduit means having their one ends open and their other ends closed extending transversely of the length of said conveyor means, means supporting a plurality of said conduit means interposed between said races and at each of the opposite sides of said paths and in close proximity thereto for removal from said enclosure through said access opening in said one wall of said enclosure, said conduit means having their ends spaced from said side walls of said enclosure, each of said conduit means having at least one discharge aperture in the side thereof facing said path of travel with which it is associated and forming the terminus of means extending therefrom towards the interior of the conduit means to direct flow of a gaseous drying medium towards said path, means defining a vertical wall adjacent to said open ends of said conduit means and spaced from said side wall of said enclosure adjacent to the open ends of said conduit means and defining with said side wall a second chamber in communication with said first chamber and said open ends of said conduit means, means for circulating under pressure a gaseous drying medium through said chambers and said conduit means and said discharge aperture whereby said drying medium is caused to impinge at high velocity against opposite surfaces of veneer conveyed by said conveyor means, and means for heating said drying medium.

4. In apparatus for drying veneer; an enlongated enclosure; conveyor means in and extending lengthwise of said enclosure for conveying veneer to be dried through said enclosure in a generally horizontal plane in a substantially flat condition, said conveyor means including a plurality of endless conveying members spaced transversely from each other and extending lengthwise of said enclosure and disposed on one side of said plane, a plurality of endless hold-down members spaced transversely from each other and extending lengthwise of said enclosure and disposed on the other side of said plane, said endless conveying members and hold-down members arranged to normally engage opposite sides of the veneer conveyed thereby; discrete takeup means for each of said endless members for maintaining a predetermined tension thereon; a plurality of driven rolls extending transversely of the length of said endless members and disposed in driving engagement with said endless members; means for driving said endless members and said rolls at the same speed; a plurality of removable discrete elongated conduit means having their one ends open and their other ends closed, extending transversely of the length of said conveyor means on opposite sides of said horizontal plane in close proximity thereto, each of said conduit means including discharge means in the side thereof adjacent to the path with which it is associated; means for circulating under pressure a drying medium through said conduit means and said discharge means to cause drying medium to impinge against opposite surfaces of veneer conveyed by said conveyor means; and means for heating said drying medium.

5. In apparatus for drying veneer an elongated enclosure, conveyor means in and extending lengthwise of said enclosure for conveying veneer to be dried through said enclosure in a generally horizontal plane in a substantially flat condition, said conveyor means including a first rotatable support means extending transversely of the enclosure and disposed on one side of said plane, a plurality of endless conveying members extending lengthwise of said enclosure and spaced transversely from each other and trained over said first rotatable support means, each of said endless conveying members including a conveying reach extending between said first rotatable support means adjacent said horizontal plane and a return reach remote from said horizontal plane, a second rotatable support means extending transversely of said enclosure and disposed on the other side of said horizontal plane, a plurality of endless hold-down members extending lengthwise of said enclosure and spaced transversely from each other and trained over said second rotatable support means, each of said endless hold-down members including a hold-down reach extending between said second rotatable support means adjacent said horizontal plane and a return reach remote from said horizontal plane; means for driving said conveying reaches and said hold-down reaches in the same direction, said conveying and hold-down being adapted to normally engage opposite surfaces of veneer conveyed by said conveyor means, a plurality of rolls extending transversely of the lengths of said conveying and hold-down members and arranged to engage the conveying reaches and return reaches of said conveying members and hold-down members respectively, take-up means for each of said endless conveying members and each of said endless hold-down members, a plurality of discrete elongated conduit means having their one ends open and their other ends closed extending transversely of the length of said conveyor means on opposite sides of said horizontal plane in close proximity thereto, each of said conduit means including discharge means in the side thereof adjacent to said plane; means for circulating under pressure a gaseous drying medium through said conduit means and said discharge means to direct the flow of drying medium against opposite surfaces of veneer conveyed by said conveyor means; and means for heating said drying medium.

6. In apparatus for drying veneer; an elongated enclosure; conveyor means in and extending lengthwise of said enclosure for conveying veneer to be dried through said enclosure in a generally horizontal plane in a substantially flat condition, said conveyor means including a first rotatable support means extending transversely of the enclosure adjacent opposite ends thereof and disposed on one side of said plane, a plurality of endless conveying members extending lengthwise of said enclosure and spaced transversely from each other and trained over said first rotatable support means, each of said endless conveying members being disposed in a substantially vertical plane and including a conveying reach extending between said first rotatable support means adjacent said horizontal plane and a return reach remote from said horizontal plane, a second rotatable support means extending transversely of said enclosure adjacent opposite ends thereof and disposed on the other side of said horizontal plane, a plurality of endless hold-down members extending lengthwise of said enclosure and spaced transversely from each other and trained over said second rotatable support means, each of said endless hold-down members being disposed in a vertical plane and including a hold-down reach extending between said second rotatable support means adjacent said horizontal plane and a return reach remote from said horizontal plane; discrete takeup means for each of said endless members for maintaining a predetermined tension thereon; means for driving said conveying reaches and said hold-down reaches in the same direction at the same speed so that said conveying and hold-down reaches normally engage opposite surfaces of the veneer as same is conveyed thereby, said drive means including a plurality of driven rolls extending transversely of the lengths of said conveying and hold-down members and in engagement with the conveying reaches and return reaches of said conveying members and hold-down members respectively; means for driving said rolls at the same speed as said endless members; a plurality of discrete elongated conduit means having their one ends open and their other ends closed, extending transversely of the length of said conveyor means on opposite sides of said horizontal plane in close proximity thereto, each of said conduit means including discharge means in the side thereof adjacent to said plane, and a discharge means in said discharge portion; means for circulating under pressure a drying medium through said conduit means and said discharge means to direct the flow of drying medium against opposite surfaces of veneer conveyed by said conveyor means; and means for heating said drying medium.

7. The apparatus described in claim 6 wherein the said vertical planes in which said endless hold-down members are disposed are spaced in the horizontal direction from the said vertical planes in which said endless conveying members are disposed.

8. In apparatus for drying veneer an elongated enclosure the cross-sectional shape of which is generally rectangular and having portions of at least one side wall movable to provide at least one access opening to the interior, conveyor means in and extending lengthwise of said enclosure and being spaced from opposite side walls thereof for conveying veneer to be dried through said enclosure in a generally horizontal plane in a substantially flat condition, said conveyor means including a plurality of endless wire cable conveying members forming a plurality of conveying members spaced transversely from each other and extending lengthwise of said enclosure on one side of said plane and a plurality of endless wire cable hold-down members spaced transversely from each other and extending lengthwise of said enclosure on the other side of said plane, said endless wire cable conveying members and hold-down members being arranged to normally engage opposite sides of the veneer conveyed by said conveyor; means for driving said members at the same speed, take-up means for each of said endless wire cable conveying and hold-down members, a plurality of discrete elongated conduit means having their one ends open and their other ends closed extending transversely of the length of said conveyor means, means supporting said conduit means at opposite sides of said plane in close proximity thereto for removal from said enclosure through said access opening in said one side wall of said enclosure, said conduit means having their ends spaced from said side walls of said enclosure, each of said conduit means including discharge means in the side thereof adjacent to said plane, said discharge means including at least one aperture and a projection extending from said aperture into the conduit means arranged to direct flow of a drying medium towards said plane, means defining a vertical wall spaced from one of said side walls of said enclosure and adjacent to said open ends of said conduit means, said vertical wall and said side wall defining a chamber in communication with said open ends of said conduit means, means for circulating under pressure a gaseous drying medium through said chamber and said conduit means and said discharge means whereby said drying medium is cause to impinge at high velocity against opposite surfaces of veneer conveyed by said conveyor means, and means for heating said drying medium.

9. In apparatus for drying veneer; an elongated enclosure the cross-sectional shape of which is generally rectangular; conveyor means in and extending lengthwise of said enclosure and being spaced from opposite side walls thereof for conveying veneer to be dried through said enclosure in a generally horizontal plane in a substantially flat condition, said conveyor means including a first rotatable support means extending transversely of the enclosure adjacent opposite ends thereof and dispose on one side of said plane, a plurality of endless conveying members extending lengthwise of said first rotatable enclosure and spaced transversely from each other and trained over said support means, each of said endless conveying members being disposed in a substantially vertical plane and including a conveying reach extending between said first rotatable support means adjacent said horizontal plane and a return reach remote from said horizontal plane, a second rotatable support means extending transversely of said enclosure adjacent opposite ends thereof and disposed on the other side of said horizontal plane, a plurality of endless hold down members extending lengthwise of said enclosure and spaced transversely from each other and trained over said second rotatable support means, each of said endless hold down members being disposed in a substantially vertical plane and including a hold down reach extending between said second rotatable support means adjacent said horizontal plane and a return reach remote from said horizontal plane; a plurality of discrete take-up means for each of said endless members for automatically maintaining a predetermined tension thereon, means for driving said conveying reaches and said hold down reaches in the same direction at the same speed so that said conveying and hold down reaches normally engage opposite surfaces of the veneer as same is conveyed thereby; a plurality of discrete elongated conduit means having their one ends open and their other ends closed, extending transversely of the length of said conveyor means on opposite sides of said plane in close proximity thereto, and having said open ends spaced from one of said side walls of said enclosure, each of said conduit means including discharge means in the side thereof adjacent to said plane including at least one aperture forming the termination of a projection extending into the conduit means arranged to direct flow of a drying medium normal to the plane; means defining a vertical wall spaced from said one wall of said enclosure and adjacent to said open ends of said conduit means, said vertical wall and said side wall defining a chamber in communication with said open ends of said conduit means; means for circulating under pressure a drying medium through said chamber, said conduit means and said discharge means whereby said drying medium is caused to impinge at high velocity against opposite surfaces of veneer conveyed by said conveyor means; and means for heating said drying medium.

10. In apparatus for drying veneer first and second dryer units each comprising elongated enclosures having a generally rectangular cross-sectional shape and conveyor means extending lengthwise through said dryer units for conveying veneer to be dried through said dryer units in a plurality of generally horizontal paths of travel, said dryer units being arranged in tandem with the exit end of said first dryer unit adjacent to but spaced from the entrance end of said second dryer unit, transfer conveyor means intermediate the exit end of said first dryer unit and the entrance end of said second dryer unit accessible from at least one side thereof for feeding veneer thereto or removing veneer therefrom transversely of its direction of travel and also arranged to receive veneer fed thereto longitudinally of its direction of travel from said conveyor means of said first dryer unit and transfer the same to said conveyor means of said second dryer unit, a plurality of removable conduit means in said elongated enclosures extending transversely of the length of said conveyor means extending therethrough and located at opposite sides of said paths of travel of the veneer and each having a side facing the paths of travel with which it is associated provided with at least one aperture forming the termination of means extending from said aperture into the interior of said conduit means, means for circulating under pressure a gaseous drying medium through said conduit means and said apertures therein to thereby cause the drying medium to impinge against veneer conveyed by said conveyor means, and means for heating said drying medium.

11. In apparatus for drying veneer first and second dryer units each comprising elongated enclosures having a generally rectangular cross-sectional shape and conveyor means extending lengthwise through said dryer units for conveying veneer to be dried through said dryer units in a plurality of generally horizontal paths of travel, means for driving said conveyor means of said dryer units independently of one another, said dryer units being arranged in tandem with the exit end of said first dryer unit adjacent to but spaced from the entrance end of said second dryer unit, transfer conveyor means intermediate the exit end of said first dryer unit and the entrance end of said second dryer unit accessible from at least one side thereof for feeding veneer thereto or removing veneer therefrom transversely of its direction of travel and also arranged to receive veneer fed thereto longitudinally of its direction of travel from said conveyor means of said first dryer unit and transfer the same to said conveyor means of said second dryer unit, a plurality of removable conduit means in said elongated enclosures extending transversely of the length of said conveyor means extending therethrough and located at opposite sides of said paths of travel of the veneer and each having a side facing the paths of travel with which it is associated provided with at least one aperture forming the termination of means extending from said aperture into the interior of said conduit means, means for circulating under pressure a gaseous drying medium through said conduit means and said apertures therein to thereby cause the drying medium to impinge against veneer conveyed by said conveyor means, and means for heating said drying medium.

References Cited

UNITED STATES PATENTS

| | | | |
|---|---|---|---|
| 835,843 | 11/1906 | Baetz | 34—162 |
| 1,578,020 | 3/1926 | Elmendorf | 34—13.8 |
| 1,642,928 | 9/1927 | Kocha | 34—205 X |
| 2,671,279 | 3/1954 | Blanchard | 34—159 |
| 2,736,107 | 2/1956 | Dungler | 34—160 |
| 2,758,386 | 8/1956 | Cobb | 34—205 X |
| 2,767,485 | 10/1956 | Holden | 34—205 |
| 2,823,467 | 2/1958 | Minami | 34—205 X |
| 2,952,078 | 9/1960 | Litzler | 34—68 |
| 2,996,811 | 8/1961 | Loechl | 34—205 |
| 3,070,902 | 1/1963 | Oholm | 34—156 |
| 3,071,886 | 1/1963 | Mangus | 34—162 X |
| 3,074,179 | 1/1963 | Stelling | 34—160 |
| 3,134,654 | 5/1964 | Russell | 34—160 |

KENNETH W. SPRAGUE, *Primary Examiner.*